US011396416B2

(12) United States Patent
Sabin et al.

(10) Patent No.: US 11,396,416 B2
(45) Date of Patent: *Jul. 26, 2022

(54) PORTABLE HEATING FOR SMALL QUANTITIES OF CONSUMER PRODUCT

(71) Applicant: Tempra Technology, Inc., Bradenton, FL (US)

(72) Inventors: Cullen M. Sabin, Bradenton, FL (US); Alan James Maskell, Grittleton (GB)

(73) Assignee: Tempra Technology, Inc., Bradenton, FL (US)

( * ) Notice: Subject to any disclaimer, the term of this patent is extended or adjusted under 35 U.S.C. 154(b) by 80 days.

This patent is subject to a terminal disclaimer.

(21) Appl. No.: 17/098,768

(22) Filed: Nov. 16, 2020

(65) Prior Publication Data

US 2021/0130072 A1 May 6, 2021

Related U.S. Application Data

(63) Continuation of application No. 15/769,806, filed as application No. PCT/US2016/059296 on Oct. 28, 2016, now Pat. No. 10,858,171.

(Continued)

(51) Int. Cl.
*B65D 81/34* (2006.01)
*F24V 30/00* (2018.01)
(Continued)

(52) U.S. Cl.
CPC ......... *B65D 81/3484* (2013.01); *A47J 36/28* (2013.01); *F24V 30/00* (2018.05);
(Continued)

(58) Field of Classification Search
CPC ....... A47J 36/24; A47J 36/28; B65D 81/3484; B65D 2581/3428; B65D 2581/3432
See application file for complete search history.

(56) References Cited

U.S. PATENT DOCUMENTS 2,239,410 A   4/1941  Bonat
3,685,507 A   8/1972  Donnelly
(Continued)

FOREIGN PATENT DOCUMENTS

FR         869290     1/1942
JP        H07155261   6/1995
(Continued)

OTHER PUBLICATIONS

Extended European Search Report for EP16860865 dated Apr. 24, 2019.
(Continued)

*Primary Examiner* — Jorge A Pereiro
*Assistant Examiner* — Nikhil P Mashruwala
(74) *Attorney, Agent, or Firm* — Seehan Phinney Bass & Green PA

(57) ABSTRACT

An apparatus for heating a product includes a storage compartment for a product to be heated and a heater module physically and thermally coupled to the storage compartment. The heater module has a housing that defines a reaction chamber. A rigid barrier is inside the reaction chamber and defines first and second portions thereof. A first reactant is inside the reaction chamber, and a flexible bag (with a second reactant) is in the first portion of the first chemical reactant. The first and second reactants react exothermically upon contact. A piercing element can pierce the flexible bag. After piercing, the fluid path and one or more fluid channels carry the second reactant to a section of the first portion of the reaction chamber away from where the flexible bag is located.

16 Claims, 9 Drawing Sheets

Related U.S. Application Data

(60) Provisional application No. 62/248,057, filed on Oct. 29, 2015.

(51) Int. Cl.
  A47J 36/28 (2006.01)
  F25D 5/00 (2006.01)
  C09K 5/16 (2006.01)

(52) U.S. Cl.
  CPC .............. *B65D 2581/3428* (2013.01); *B65D 2581/3432* (2013.01); *C09K 5/16* (2013.01); *F25D 5/00* (2013.01)

(56) References Cited

U.S. PATENT DOCUMENTS

| | | | |
|---|---|---|---|
| 4,741,324 A | 5/1988 | Ina | |
| 4,773,389 A | 9/1988 | Hamasaki | |
| 7,025,055 B2* | 4/2006 | Scudder | B65D 81/3484 126/263.08 |
| 7,431,837 B2 | 10/2008 | Cohee | |
| 7,968,250 B2 | 6/2011 | Kaschmitter et al. | |
| 9,428,318 B2 | 8/2016 | Young | |
| 2004/0112367 A1 | 6/2004 | Zaninelli | |
| 2006/0162344 A1 | 7/2006 | Scudder et al. | |
| 2006/0169276 A1 | 8/2006 | Scudder et al. | |
| 2007/0217971 A1 | 9/2007 | Michalsky | |
| 2009/0199843 A1 | 8/2009 | Farone et al. | |
| 2010/0078010 A1* | 4/2010 | Kolb | B65D 81/3484 206/459.1 |
| 2010/0227027 A1 | 9/2010 | Ford et al. | |
| 2013/0025296 A1* | 1/2013 | Leavitt | F24V 30/00 62/4 |

FOREIGN PATENT DOCUMENTS

| | | |
|---|---|---|
| JP | H08240345 | 9/1996 |
| JP | 2015077282 | 4/2015 |
| WO | 2007000626 | 1/2007 |
| WO | 2009036186 | 3/2009 |
| WO | 2010053467 | 5/2010 |

OTHER PUBLICATIONS

International Search Report and Written Opinion for PCT/US2016/059296, dated Jan. 3, 2017.

* cited by examiner

PORTABLE HEATING FOR SMALL QUANTITIES OF CONSUMER PRODUCT

CROSS REFERENCE TO RELATED APPLICATION(S)

This application is a continuation of U.S. patent application Ser. No. 15/769,806, entitled PORTABLE HEATING FOR SMALL QUANTITIES OF CONSUMER PRODUCT and filed Apr. 20, 2018, which is a national phase of International Application number PCT/US16/59296, entitled PORTABLE HEATING FOR SMALL QUANTITIES OF CONSUMER PRODUCT and filed on Oct. 28, 2016, which claims the benefit of priority to U.S. Provisional Patent Application No. 62/248,057, filed on Oct. 29, 2015 and entitled Portable Heating for Small Quantities of Consumer Product. The disclosure of the prior application is incorporated by reference herein in its entirety.

FIELD OF THE INVENTION

This disclosure relates to a portable heater and, more particularly, relates to a portable heater for small quantities of consumer product.

BACKGROUND

A need exists for a safe system for anywhere heating of small consumer products. Examples of such applications are heating of nacho dip, dessert toppings, and heating of glues and sealants in cold weather.

SUMMARY OF THE INVENTION

In some aspects, an apparatus is disclosed for heating a product includes a storage compartment for a product to be heated and a heater module physically and thermally coupled to the storage compartment. The heater module has a housing that defines a reaction chamber. A rigid barrier is inside the reaction chamber and defines first and second portions thereof. A first reactant is inside the reaction chamber, and a flexible bag (with a second reactant) is in the first portion of the first chemical reactant. The first and second reactants react exothermically upon contact. A piercing element can pierce the flexible bag. After piercing, the a fluid path and one or more fluid channels carry the second reactant to a section of the first portion of the reaction chamber away from where the flexible bag is located.

BRIEF DESCRIPTION OF THE DRAWINGS

Like reference characters refer to like elements.

DETAILED DESCRIPTION

In some implementations, the systems and/or methods described herein are based on the interchange of heat between two masses by conduction across a common interface, so that the two masses tend toward the same temperature. In a typical implementation, one mass (i.e., a heater) would be heated in a short period of time to a maximum temperature and then allowed to cool by transferring a portion of its heat to a target material (e.g., a food or other substance to be heated). The length of time during which the product may need to be heated by this means to reach a desired temperature can depend on a variety of factors including, for example, the product's viscosity, heat capacity, and thermal conductivity. If the hot mass (i.e., the heater) were designed to never exceed a chosen maximum temperature then the system could be used in virtually any condition of reasonable use without a significant risk of injury. It remains, however, to provide the hot mass on demand.

In certain implementations, the heater may be configured to produce heat by initiating a chemical reaction between a potassium permanganate solution and a glycerine-water solution. Moreover, this heating may involve heating of liquid masses by the reaction of potassium permanganate and glycerine in water. The final temperature of the water solution after completion of the reaction is generally governed by the concentration of the two chemicals in the reaction. The present application, which employs the reactants above as one choice but can employ other heat producing reactions as well, describes the arrangement and activation of a heater appropriate for the purposes cited above.

Figure 1:
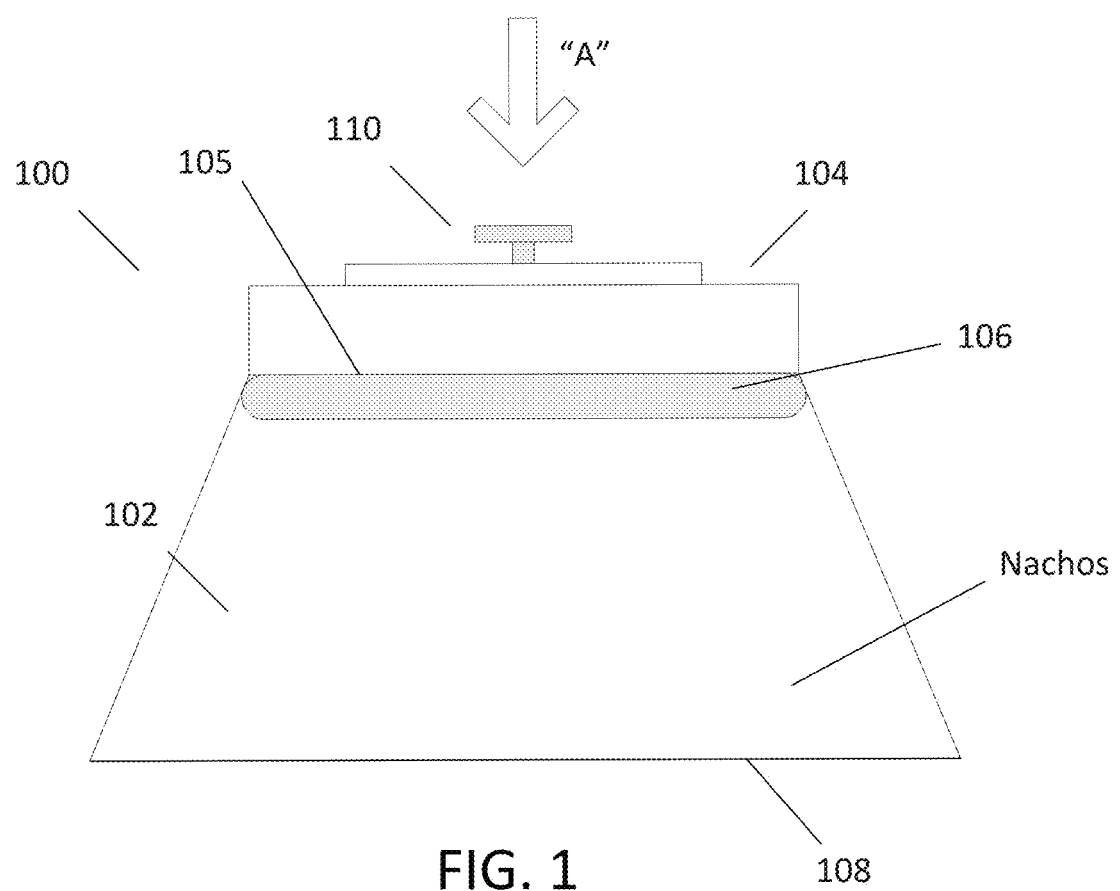
FIG. 1 is a schematic, cross-sectional vi of an exemplary portable, self-heating food container.

FIG. 1 is a schematic, cross-sectional view of an exemplary portable, self-heating food container 100.

The illustrated container 100 has a sealed food compartment 102 containing food (e.g cheese 106 and nachos. The nachos are not shown in the figure, but would generally be located in the space below the cheese 106, labeled "Nachos"), and a heater module 104. The heater module 104 is physically and thermally coupled to the food compartment 102 by a common, heat transfer wall 105 between the heater module 104 and the food compartment 102. The heater module 104 is configured to generate heat when operated to heat and melt the cheese 106. In a typical implementation, the cheese, when heated will melt and drip down over, and coat, the nachos.

After heating and melting, the apparatus 100 can be turned upside down (relative to the configuration shown in FIG. 1), the seal 108 (a removable cover) can be removed and the nachos, now coated with a warm or hot cheese can be enjoyed!

The heater module 104 is easy to operate. In the illustrated example, the heater module has an activation button 110. To initiate heating, a person merely needs to depress the button 110 (in direction indicated by the arrow "A"). A few moments later, heat begins to pass from the heater module 104 into the sealed food compartment 102 to heat and melt the cheese 106. In some implementations, the container 100 may be sold with a cover (not shown in the figure) over the activation button 110 that needs to be removed in order to access the button and initiate the heating.

Thus, in a typical implementation, the illustrated self-heating container provides a great snack nachos with hot melted cheese anywhere, anytime, quickly and conveniently.

Figure 2:
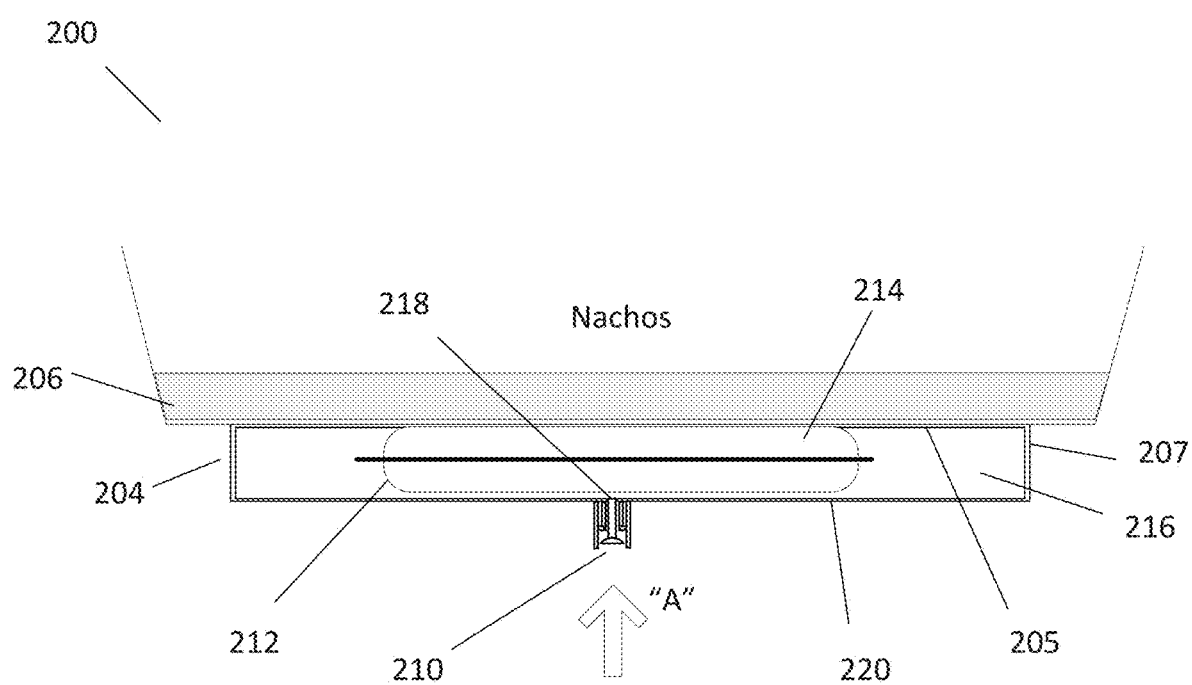
FIG. 2 is a schematic, cross-sectional view of a container design that details one possible way of implementing self-heating in a container like the one in FIG. 1.

FIG. 2 is a cross-sectional view of a container design 200 that details one way of implementing the self-heating container 100 of FIG. 1. Although the illustrated implementation can, in some instances, be effective, there are drawbacks, many of which can be overcome by, implementing one or more concepts also described herein.

The illustrated apparatus 200 has a storage compartment 202 containing product to be heated (e.g., cheese 206 that will melt onto nachos). In a typical implementation, the material to be heated (in this case cheese dip) would be sealed inside the container by a removable seal (not shown).

A heater module 204 is physically and thermally coupled to the storage compartment 202 and is configured to produce heat when activated for heating the cheese in the storage compartment 202.

The heater module 204 has a housing 207 that defines a reaction chamber. There is a first liquid chemical reactant 214 (e.g., potassium permanganate solution) inside the reaction chamber, and a flexible container 212 (e.g., a bag) inside the reaction chamber, and immersed in the first liquid chemical reactant 214. There is a second liquid chemical reactant 216 (e.g., a glycerine solution) inside the flexible container 212. The second liquid reactant 216 is configured to react exothermically with the first chemical reactant 214 upon contact.

The flexible container 212 is located between a heat transfer surface 205 (for heat to flow from the heater module 204 to the storage compartment 202) and a base 220 of the heater module 204.

A piercing element 218 (attached to an external activation button 210) is movable (in direction "A") to pierce the flexible container 212 and to enable at least some of the second liquid chemical reactant 216 to exit the flexible container 212 and mix with the first liquid chemical reactant 214. In a typical implementation, the activation button 210 has a tamper resistant feature (not shown) and features (also not shown) that cause the activation button (and piercing element 218) to latch or lock in the "in position" so, once depressed (e.g., moved in the direction of arrow "A"), it will remain in that position.

In some instances, the illustrated implementation can be somewhat effective. However, there are also several notable drawbacks, which are described below.

Drawback One: there is no strong force that helps eject the first liquid chemical solution 214 (e.g., the glycerine solution) from the flexible container 212. Indeed, in a typical implementation, some or most of that solution 214 remains in the flexible container 212 regardless of the nature of the hole created by the piercing element 218.

Drawback Two: the flexible container 212 is sometimes, or often, flexible enough to close around the piercing element 218 and effectively close (i.e., prevent flow through) the hole in the flexible container 212 created by the piercing element 218.

Drawback Three: the flexible container 212, in some instances, can seal against the base of the heater, effectively preventing or inhibiting the first liquid chemical reactant's 214 escape from the flexible container 212 into the second liquid chemical reactant 216.

Drawback Four: even if the other problems mentioned herein were solved or their deleterious effects minimized, the single hole in the flexible container 212 can be expected to discharge the first liquid chemical reactant into only a small portion of the reaction chamber, so that only a limited portion of the chemicals react, and, as a result, the heater module 204 will produce an inadequate amount of heat to satisfy its intended purpose.

Drawback Five: since the piercing element 218 crosses the boundary between the outside and inside of the heater module 204 housing 207, a leakage path exists, or may easily form, around the shaft of the piercing element 218.

Figure 3:
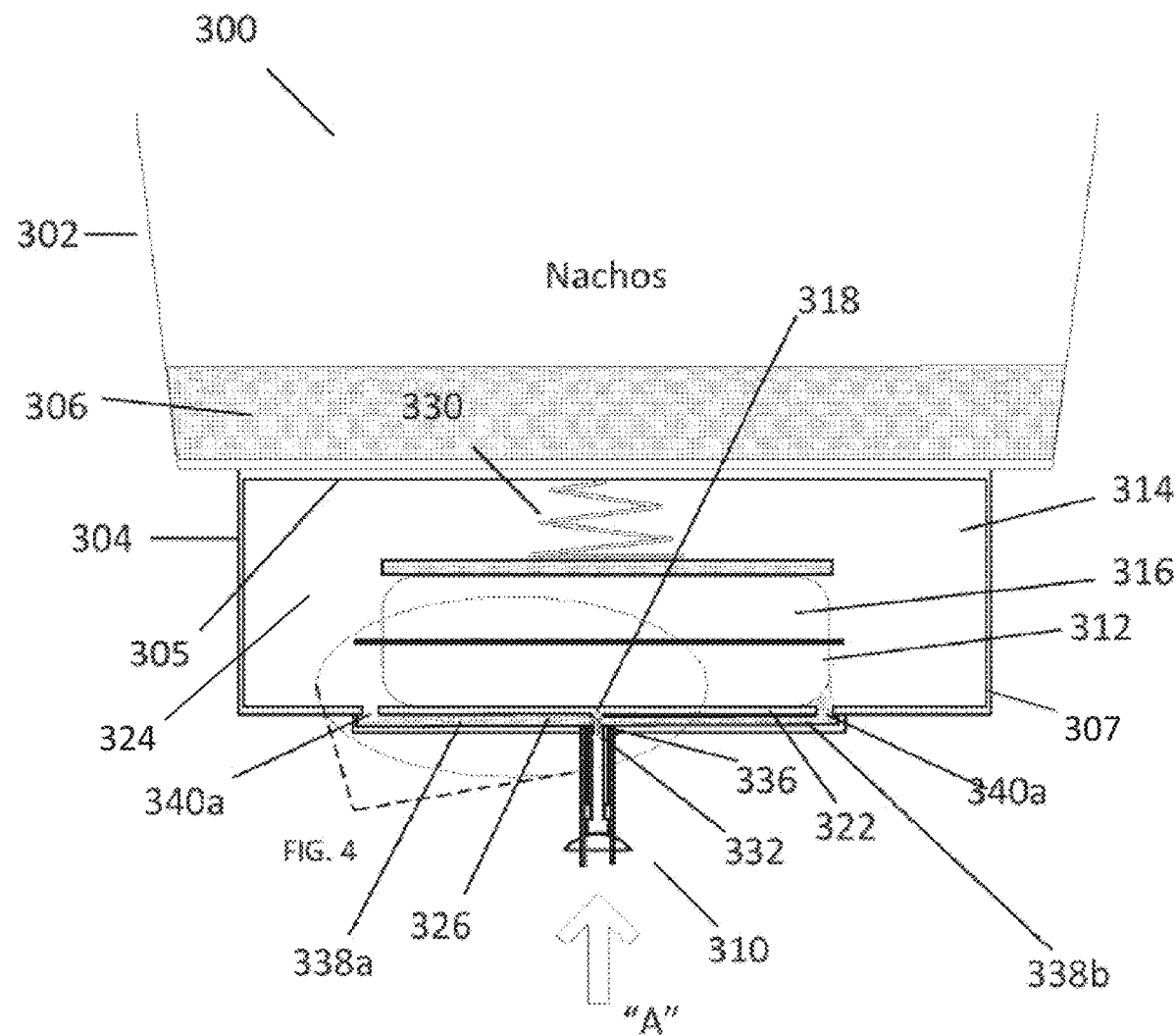
FIG. 3 is a schematic, cross-sectional view of a container design that details another way of implementing the self-heating in a container like the one in FIG. 1.
Figure 4:
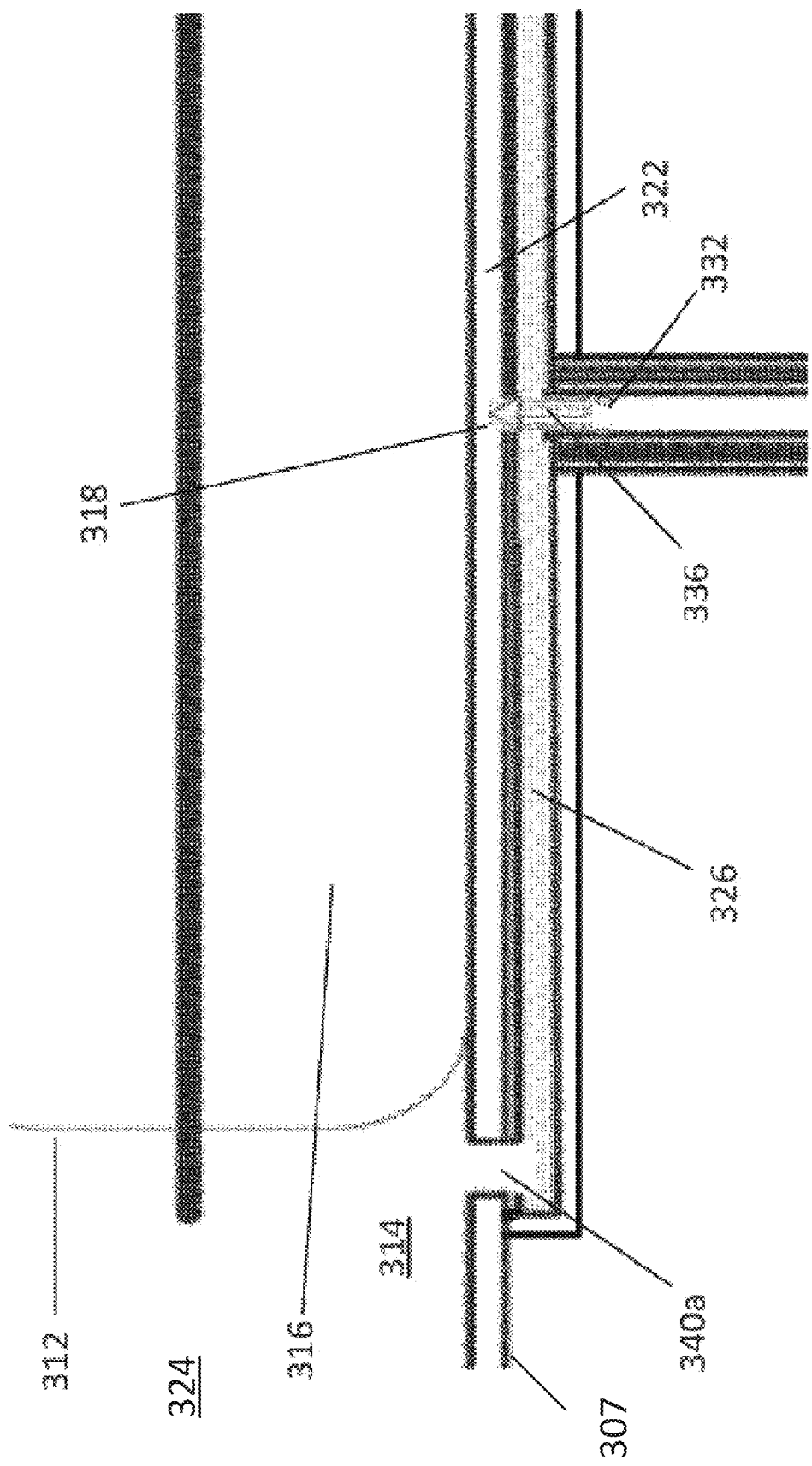
FIG. 4 is a close-up vi showing part of the FIG. 3 container.

FIG. 3 is a schematic, cross-sectional view of a container 300 that details another way of implementing the self-heating container 100 in FIG. 1; FIG. 4 is a close-up view showing part of the FIG. 3 container 300. The container 300 in FIG. 3 and in FIG. 4 is, in some ways, similar to the container 200 in FIG. 2. As discussed herein, however, the container 300 in FIG. 3 is able to overcome or at least mitigate one or more (or all) of the above-mentioned, and perhaps other, drawbacks associated with the container 200 in FIG. 2.

The container 300 in FIG. 3 has a storage compartment 302 containing product to be heated (e.g., cheese 306 that will melt onto and mix with nachos). In a typical implementation, the material to be heated (in this case cheese dip) would be sealed inside the storage compartment 302 by a removable seal (not shown).

A heater module 304 is physically and thermally coupled to the storage compartment 302 and is configured to produce heat when activated for heating at least the cheese in the storage compartment 302. The heater module 304 has a housing 307 that defines a reaction chamber. In this regard, the reaction chamber has multiple walls, at least one of which is in direct physical contact with and thermally coupled to the storage compartment 302.

There is a first liquid chemical reactant 314 (e.g., potassium permanganate solution) inside the reaction chamber, and a flexible container 312 (e.g., a plastic bag) inside the reaction chamber, and immersed in the first liquid chemical reactant 314. There is a second liquid chemical reactant 316 (e.g., a glycerine solution) inside the flexible container 312. The second liquid reactant 316 is configured to react exothermically with the first chemical reactant 314 upon contact.

There is a rigid barrier 322 inside the reaction chamber that defines a first portion 324 of the reaction chamber from a second portion 326 of the reaction chamber. Generally speaking, in the illustrated implementation, the first portion 324 of the reaction chamber includes the area above the rigid barrier 322, and the second portion 326 of the reaction chamber includes the area below the rigid barrier 322. There are fluid communications portals that fluidly connect the first portion 324 of the reaction chamber to the second portion 326 of the reaction chamber. The term reaction chamber should be construed broadly to include any section(s) of the heater module 304 (e.g., in the first portion 322 of the reaction chamber, the second portion 326 of the reaction chamber, or elsewhere) where any portion of the first liquid chemical reactant 314 or second liquid chemical reactant might be contained and/or react during normal system heating operations.

The rigid barrier 322 may be any one of a variety of possible shapes and may define the first portion 324 of the reaction chamber and the second portion 326 of the reaction chamber to have any one of many possible different physical configurations. However, generally speaking, the rigid barrier 322 defines separate portions of the reaction chamber—the first portion 324 that physically accommodates the flexible container 312, and the second portion 326 that is physically separate from the first portion 324 during all phases of system operation and that generally does not include any part of the flexible container 312 during any phase of system operation. As discussed in further detail herein, the second portion 326 of the reaction chamber provides a clearly defined, unobscured fluid communication path for the second liquid chemical reactant to freely exit and move clear of the flexible container 312. In a typical implementation, this fluid communication path retains its shape, and remains substantially unobstructed, throughout system operation, even as the flexible container 312 empties and, therefore collapses.

The flexible container 312 is positioned atop the rigid barrier 322 in the illustrated implementation, and is configured so that its outer side edges are close to, but do not overlap with, the fluid communications portals that fluidly connect the first portion 324 of the reaction chamber to the second portion 326 of the reaction chamber.

There is a spring-loaded movable platform 328 at an opposite side of the flexible container 312 from the rigid barrier. The movable platform 328 in the illustrated implementation is configured to move in a downward direction (i.e., toward the flexible container 312) to help initiate heating and ensure thorough mixing of the liquid chemical reactants 314, 316. The movable platform 328 is in direct physical contact with the flexible container 312 and, therefore, any downward motion, such as might occur when the flexible container 312 is ruptured by a piercing element, will tend to collapse and help empty the flexible container 312. In a typical implementation, the movable platform 328 is large enough to cover all or at least a very substantial portion of the flexible container 312.

There is a spring 330 at an opposite side of the movable platform 328 from the flexible container 312. The spring 330 in the illustrated implementation is in direct physical contact with the movable platform and with the upper wall (i.e., the heat transfer surface) of the reaction chamber. In a typical implementation, before the flexible container has been pierced, the spring 330 is in a highly compressed state and is urging the movable platform 328 in a downward direction (i.e., toward the flexible container 312).

Once the flexible container 312 is pierced, the spring 330 begins to extend, thereby causing the movable platform 328 to move in direction that helps to collapse the flexible container 312 (i.e., downward in FIG. 3), thereby encouraging the second liquid reactant 316 to exit the flexible container 312 and travel through fluid communication paths and/or channels defined by the rigid barrier 322 after the flexible container has been pierced.

The spring 330 is typically configured so that it can move the movable platform 328 from its position (as shown in FIG. 3) atop the full and completely intact flexible container 312 all the way down to a position where it is pressing the fully deflated (and emptied) flexible container flat against the rigid barrier 322, so that only the fully deflated (and emptied) flexible container 312 remains between the movable platform 328 and the rigid barrier 322.

In some implementations, prior to heater activation (e.g., in the configuration shown in FIG. 3), the spring-loaded platform 328 presses down on the full and completely intact flexible container 312 to help keep the flexible container 312 in place between the movable platform 328, and the rigid barrier 322, and positioned so as to not cover any of the fluid communications portals that fluidly connect the first portion 324 of the reaction chamber to the second portion 326 of the reaction chamber. In some implementations, additional (or other) means may be used to help keep the flexible container 328 in place. These can include, for example, the use of an adhesive between the platform 328 and the flexible container 312 and/or between the upper surface of the rigid barrier 322 and the flexible container 312. Alternatively, these can include features formed in the bottom surface of the movable platform 328 and/or the upper surface of the rigid barrier configured to discourage sideways motion by the flexible container 312 within the reaction chamber.

The illustrated self-heating system 300 has a piercing element 318 (attached to an external activation button 310) configured to pierce the flexible container 312 when the activation button 310 is pressed (i.e., moved in a direction indicated by arrow "A"). Piercing the flexible container 312, of course, enables the second liquid chemical reactant 216 to exit the flexible container 212 and mix with the first liquid chemical reactant 214.

In some implementations, the self-heating system 300 includes one or more anti-tamper features (not shown) associated with the activation button 310. Generally speaking, an anti-tamper feature may provide or facilitate tamper resistance, tamper detection, tamper response, and/or tamper evidence. In some applications, the anti-tamper feature(s) are only tamper-evident. Moreover, in some implementations, the self heating system 300 includes one or more locking features (also not shown) that cause the activation button (and piercing element 218) to latch or lock into the depressed (or "heater activated") position. In those implementations, once the activation button has been pressed (i.e., moved in the direction of arrow "A" in FIG. 3), the activation button 310 and the piercing element 318 become locked in that position.

The activation button 310 is exposed for user manipulation outside the housing 307 of the reaction chamber. The shaft of the activation button/piercing element, therefore, extends essentially through the housing 307 and into the reaction chamber. In this regard, there is a portion of the piercing element that has a smooth cylindrical outer surface. That portion extends through an opening in the housing 307 where there is an elastomeric seal 332 (e.g., an o-ring) between the smooth cylindrical outer surface of the piercing element and the housing 307. The portion of the shaft of the activation button/piercing element that has the smooth cylindrical outer surface is long enough, in an axial direction, that the elastomeric seal remains in contact with and seals against the smooth cylindrical outer surface regardless of the piercing element's position relative to the housing (e.g., regardless of whether the activation button is fully extended or fully depressed).

Referring to the detailed view in FIG. 4, the piercing element 318 essentially forms a needle with a cylindrical body that has a pointed distal tip and a distal portion (at or very near the pointed distal tip) with a fluted external surface that has grooves 336 that extend some distance along the external surface in a substantially axial direction. Generally speaking, a piercing element 318 can have one or more grooves 336. In a typical implementation, the grooves 336 will be evenly spaced from one another about a perimeter of the otherwise cylindrical piercing element shaft.

The illustration shows two fluid distribution channels (338a, 338b) in the second portion 326 of the reaction chamber (i.e., the portion of the reaction chamber beneath the rigid barrier 322). Each of the illustrated fluid distribution channels (338a, 338b) extends from the roughly centrally located piercing element 318 outward in a substantially radial direction. Moreover, these fluid distribution channels 338a, 338b extend in approximately opposite directions from the roughly centrally located piercing element 318. Each fluid distribution channel 338a, 338b terminates at a respective one of the fluid communications portals 340a, 340b that fluidly connects its associated fluid distribution channel 338a, or 338b to a portion of the second portion 326 of the reaction chamber that is away from the flexible container 312. Thus, each fluid distribution channel 338a, 338b (and its associated fluid communication portal) is configured to carry some portion of the second liquid chemical reactant released from the flexible container 312 to a section of the first portion of the reaction chamber away from where the flexible container 312 is located after the flexible container 312 has been ruptured.

Figure 5:
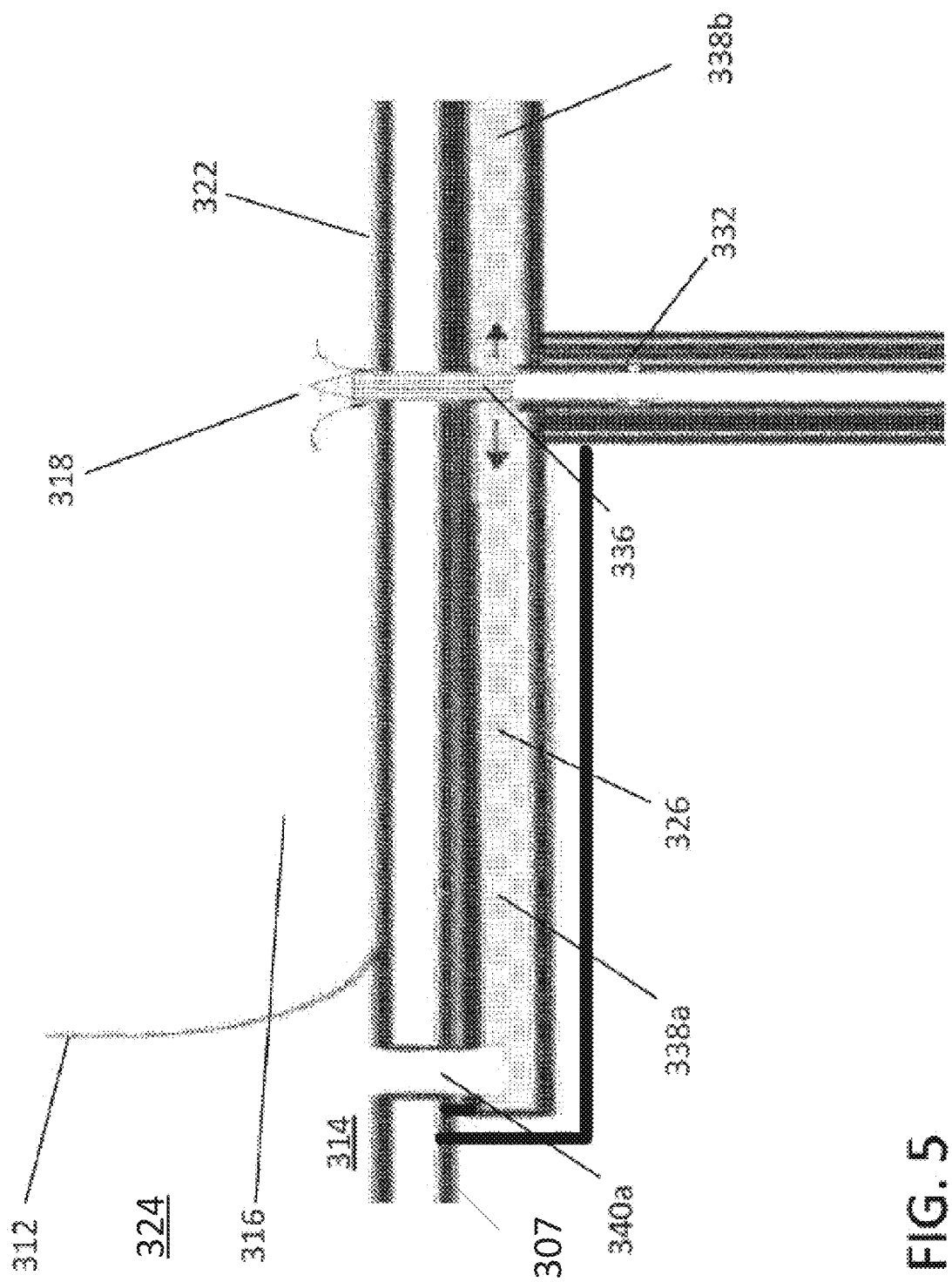
FIG. 5 is a close-up view showing part of the FIG. 3 container, with its piercing element having pierced the inner flexible bag.

In a typical implementation, the piercing element 318 is configured to move (when the activation button 310 if appropriately manipulated, e.g., pressed) in an axial direction from a first position, as shown in FIG. 4 (entirely outside the flexible container 312) to a second ("activated") position, as shown in FIG. 5 (extended into the flexible container 312). More particularly, when the piercing element 318 in the second ("activated") position (FIG. 5), the pointed distal tip 334 of the piercing element 318 is inside the flexible container 312. Moreover, when the piercing element 318 is in the second ("activated") position (FIG. 5), the fluted portion of the piercing element shaft extends from inside the flexible container 312, through the rigid barrier 322, and to the fluid distribution channels 338a, 338b in the second portion 326 of the reaction chamber (beneath the rigid barrier). Each groove 336 in the fluted portion of the piercing element shaft is typically wide enough and deep enough to facilitate a relatively easy flow of the first liquid chemical reactant (e.g., the glycerine solution) out of the collapsing flexible container 312 and into the fluid distribution channels 338a, 338b.

It is apparent that the fluid distribution channels 338a, 338b in the illustrated implementation are configured to carry the second liquid chemical reactant to a section of the first portion of the reaction chamber away from where the flexible container 312 is located so that the flexible container 312 is not able to block the second liquid chemical reactant from entering the reaction chamber and mixing sufficiently with the first liquid chemical reactant.

Figure 6:
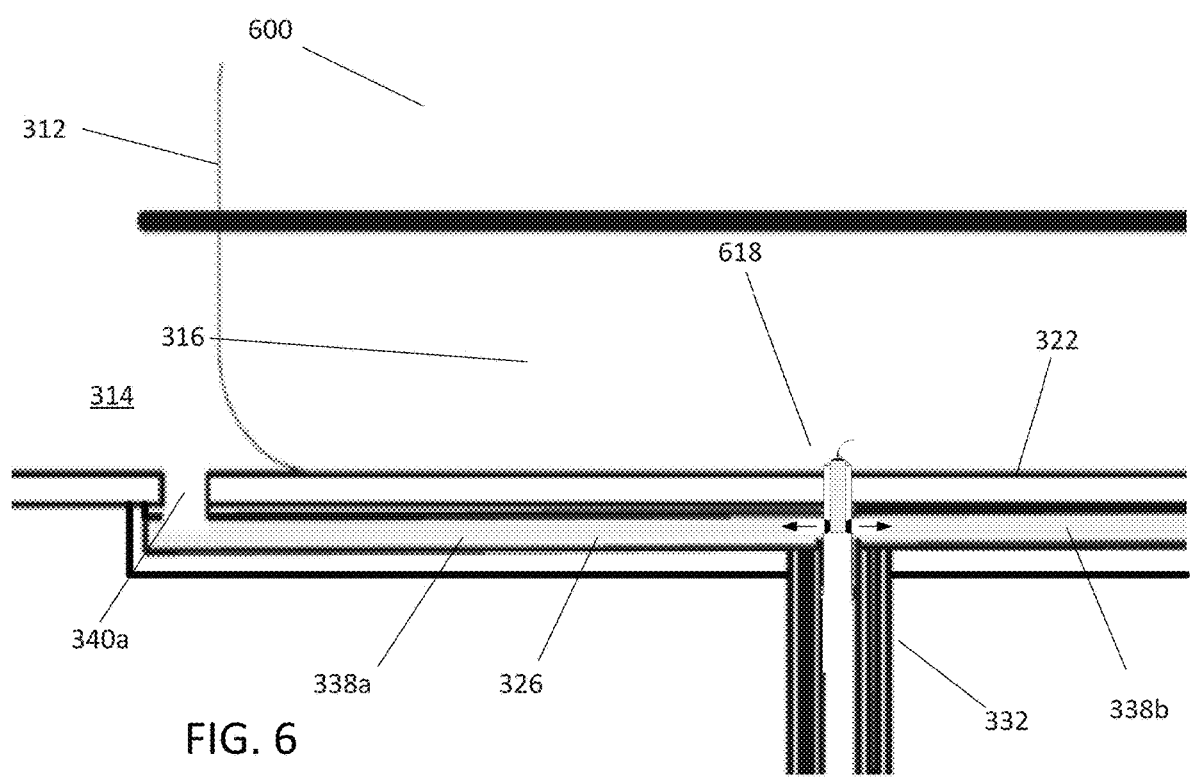
FIG. 6 is a close-up view of yet another container design that is similar to the container design in FIG. 3, but includes an alternative piercing element configuration.

Generally speaking, in one or more implementations of the container in FIG. 3, one or more of the drawbacks mentioned above in connection with the container of FIG. 2 can be overcome. For example, in some implementations:
1. Drawback one may be eliminated, or at least mitigated, by providing a spring-loaded platform 328 inside the heater module. In this regard, the spring-loaded platform 328 is generally configured to squeeze the flexible container 312 and thereby provide an internal pressure to the flexible container 312. In a typical implementation, as mentioned above, the stroke of the spring 330 is long enough to empty all of the fuel out of the bag. In addition, in some implementations, the flexible container may be an elastomeric bag under tension, so that the edges of the bag are pulled into the center, eliminating trapped volumes in the corners.
AND/OR
2. Drawback Two may be overcome, or at least mitigated, by using a piercing element 318 of sufficient diameter to incorporate a defined flow path (e.g., with the grooves in the fluted portion of the piercing element shaft), and arranging the piercing element 318 so that the grooves extend across the membrane of the flexible container 312 (and into the second portion of the reaction chamber (beneath the rigid barrier 322) after the flexible container 312 has been pierced. This flow path can be formed with a sharp-ended rod that has grooves along its shaft to provide a flow path across the membrane, as shown, for example, in FIG. 5. Another alternative piercing element design is represented in FIG. 6 (discussed below), in which a hollow tube is provided (instead of a rod with external grooves) to form a flow path for the first liquid chemical reactant (i.e., the activator).
AND/OR
3. Drawback Three may be overcome, or at least mitigated, by providing a cavity in the space around the piercing element which is small enough in diameter and deep enough that the fuel bag cannot close the flow path. A path or paths lead from the cavity into the heater enclosure, completing the flow path from the interior of the fuel bag to the interior of the reaction chamber.
AND/OR
4. Drawback Four may be eliminated, or at least mitigated, by providing radial flow paths (e.g., fluid transmission channels) to duct the first liquid chemical reactant (e.g., the fuel) beyond an area of any potential fuel bag (i.e., flexible container) seal.
AND/OR
5. Drawback Five may be eliminated, or at least mitigated, by providing an elastomeric self-sealing gasket (e.g., an o-ring) around the shaft of the piercing element. This can be placed in a location beyond the grooves or holes in the piercing element so that at all times it lies against the smooth barrel of the piercing element. Generally speaking, since the heater module itself is at no time substantially pressurized, the maximum pressure across the seal will never exceed the sealing capabilities of the seal.

FIG. 6 is a partial, schematic, cross-sectional side view of a self-heating container 600 design that is similar in many respects to the self-heating container 300 shown in FIG. 3 and discussed herein above. The piercing element 618 in the container 600 of FIG. 6, however, is different than the piercing element 318 in the container 300 of FIG. 6. More particularly, the piercing element 618 in FIG. 6 essentially forms a needle with a hollow tubular body with an opening at or near a pointed distal end thereof and one or more openings in a sidewall thereof. Fluid can flow into the opening at or near the pointed distal end of the piercing element 618, through the hollow tubular body in an axial direction, and out through the one or more sidewall openings to escape the flexible container 312.

Figure 7:
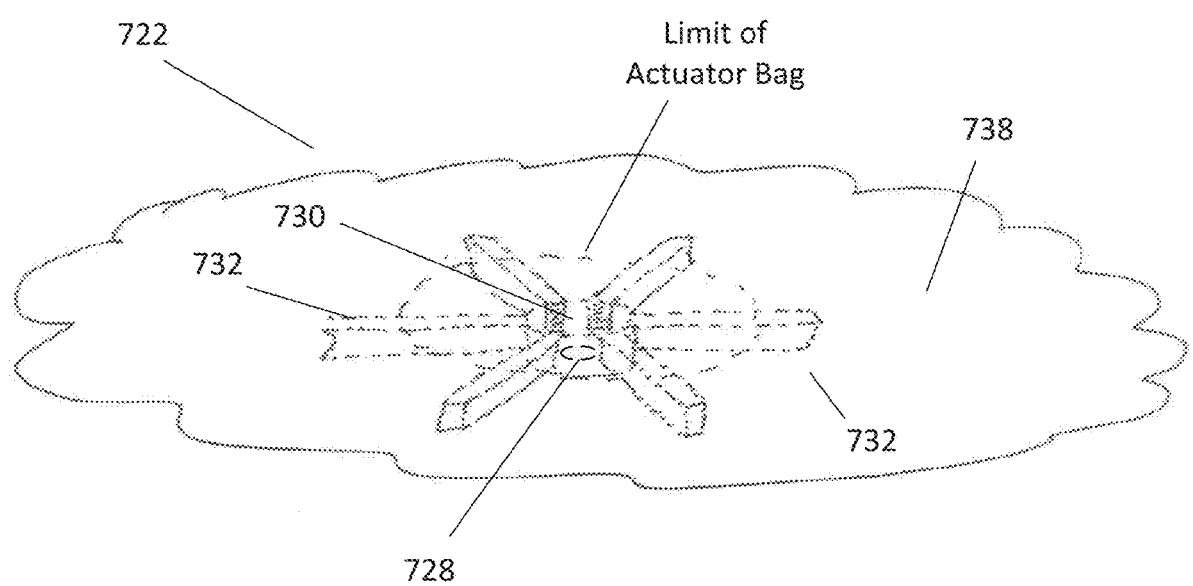
FIG. 7 is a perspective, partial cut-away view of an exemplary distribution manifold that may define fluid communication paths for the liquid chemical reactant to flow in a container like the one in FIG. 3.

FIG. 7 is a perspective, partial cut-away view of an exemplary distribution manifold 722 that may define fluid communication paths for the first liquid chemical reactant (e.g., the activator). The illustrated manifold is formed in a base 734 (i.e., a lower surface) of a heater module (e.g., 304). It includes a piercer hole 728, a plenum 730 and six slots 732 (or fluid distribution channels) that extend radially outward from the centrally-disposed plenum 730.

The piercer hole 728 is a substantially cylindrical hole that extends all the through the base and, in the illustrated implementation, is centered relative to the substantially cylindrical concentric plenum 730. The plenum 730 is larger than the piercer hole 728 and extends only partially through the base. The slots 732 also extend only partially through the base.

The figure shows a dashed line that shows the limit of where the activator bag (i.e., the flexible container) can cover. Notably, the outer, distal edges of the slots extend beyond that limit. This helps ensure that, during operation, the activator bag will not be able to block any fluid flow paths through the slots 732.

In some implementations, the distribution manifold is formed directly in a bottom surface of the heater module. In these implementations, the piercer hole may be drilled through the base, the plenum may be partially drilled into an upper surface (i.e., facing the reaction chamber) of the base and the slots may be similarly partially drilled or etched into the upper surface of the base. In other implementations, the distribution manifold may be a separate piece that is attached to the heater module.

Figure 8:
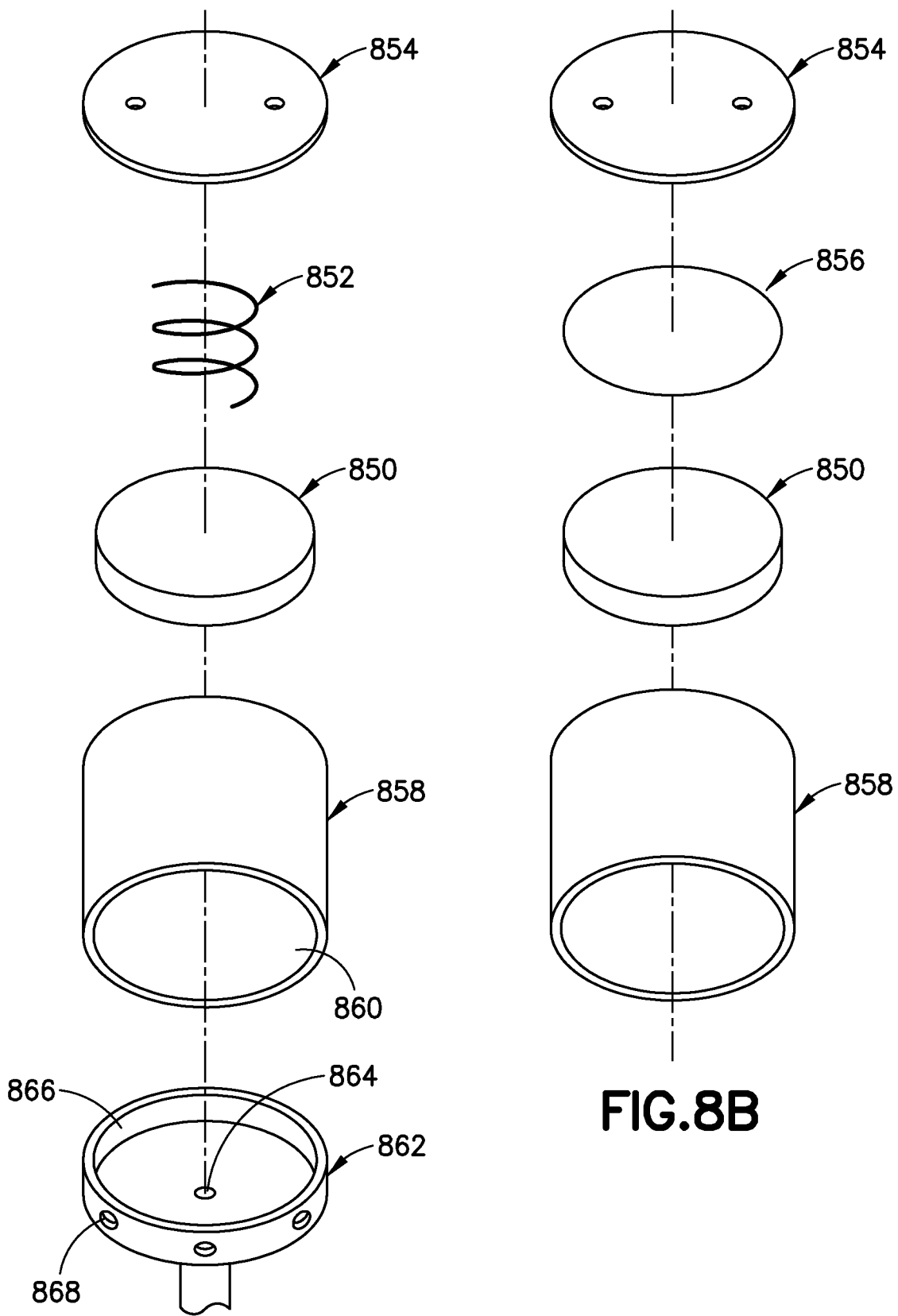
FIG. 8A is an exploded view showing part of an alternative heater module arrangement.
FIG. 8B is an exploded view showing part of another alternative heater module arrangement.

FIG. 8A is an exploded view showing part of an alternative heater module arrangement. According to the illustrated alternative, the heater module includes a piston and cylinder assembly in lieu of the container and spring-loaded platform in FIG. 3, for example.

More particularly, the illustrated implementation includes a cylinder 858 and a piston 850 with a cup seal that is sized to move up and down inside the cylinder 858. There is a spring 852 above the piston 852 that gets compressed, when assembled, between the piston 850 and a vented base cover 854 at the top of the cylinder. There is a membrane 860 that seals the bottom of the cylinder and one of the reactants would be inside the cylinder until the heater is activated. In a typical implementation, the vented base cover prevents a vacuum from forming behind the piston as it moves down through the cylinder.

There is a distribution manifold 862 below the cylinder 858. The distribution manifold 862 includes a hole 864 to accommodate a piercing element, a plenum 866 and a plurality of holes (or fluid distribution channels) 868 that extend in a radially outward direction from the plenum 866. The piercing element is configured to extend through the hole 864 and pierce the membrane 860 to initiate heating.

FIG. 8B is an exploded view showing part of an alternative heater module arrangement. The arrangement in FIG. 8B is similar to the arrangement in FIG. 8A. However, the arrangement in FIG. 8B includes an air bag 856 to urge the piston in a downward direction instead of a spring.

Figure 9:
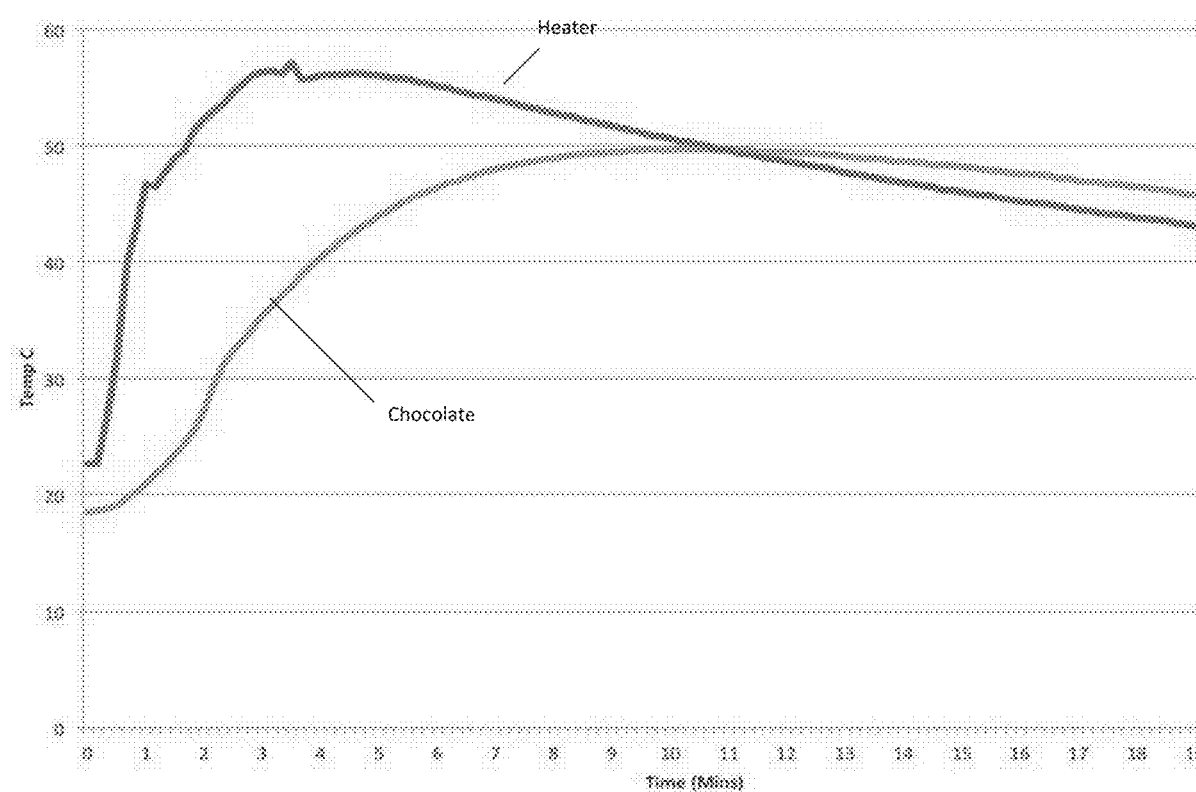
FIG. 9 is a graph showing temperature over time of a heater and a product being heated.

Trials of an exemplary heater activation system have shown that it works well. As an example, FIG. 9 presents a graph of the temperature history of a particular test. Shown are the temperatures of the heater and target. In this case, the substance being heated is milk chocolate.

A number of embodiments of the invention have been described. Nevertheless, it will be understood that various modifications may be made without departing from the spirit and scope of the invention.

For example, the specific size, shape and relative arrangement of components can vary considerably. Various different materials and chemicals may be used for the different components.

The first liquid chemical reactant (e.g., the activator) is preferably in a bag. However, the bag may be replaced by a syringe-type of rigid container, or other type of container. Either chemical reactant can be provided in the bag, with the other outside the bag.

An activation button is pressed to initiate heating. However, the activation element can be virtually any kind of activation element including, for example, a knob, a switch, etc.

Likewise, the spring may be replaced by an airbag or the like.

The heating concepts can be applied to a wide variety of heating applications.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, the separation of various system components in the embodiments described above should not be understood as requiring such separation in all embodiments, and it should be understood that the described program components and systems can generally be integrated together in a single product or packaged into multiple products.

It should be understood that relative terminology used herein, such as "upper", "lower", "above", "below", "beneath", etc. is solely for the purposes of clarity and is not intended to limit the scope of what is described here to require particular positions and/or orientations. Accordingly, such relative terminology should not be construed to limit the scope of the present application. Additionally, the term substantially, and similar words, such as substantial, are used herein. Unless otherwise indicated, substantially, and similar words, should be construed broadly to include both completely and almost completely.

Other implementations are within the scope of the claims.

What is claimed is:

1. An apparatus for heating a product, the apparatus comprising:
    a housing that defines a reaction chamber;
    a rigid barrier inside the reaction chamber that demarcates a first portion of the reaction chamber from a second portion of the reaction chamber;
    a first liquid chemical reactant inside the reaction chamber;
    a flexible container inside the first portion of the reaction chamber, and immersed in the first liquid chemical reactant,
    a second liquid chemical reactant within the flexible container that is configured to react exothermically with the first chemical reactant upon contact;
    a piercing element that is movable to pierce the flexible container and to help define a fluid communication path from inside the flexible container to the second portion of the reaction chamber when a distal end of the piercing element is extended into the flexible container.

2. The apparatus of claim 1, further comprising:
    a platform configured to contact the container at an opposite side of the flexible container from the piercing element.

3. The apparatus of claim 2, further comprising:
one or more fluid distribution channels in the second portion of the reaction chamber configured to carry the second liquid chemical reactant from the fluid communication path to a section of the first portion of the reaction chamber away from where the flexible container is located; and
a spring or airbag configured to urge the platform in direction that tends to collapse the container after the piercing element has pierced the container, thereby encouraging the second reactant to exit the flexible container, travel through the fluid communication path and the one or more fluid distribution channels after the flexible container has been pierced.

4. The apparatus of claim 1, wherein the piercing element comprises:
a needle with a hollow tubular body having an opening at or near a distal end thereof, wherein the opening connects to a fluid path that extends axially though at least part of the needle, and one or more openings in a sidewall of the needle along the fluid path, or
a needle having a cylindrical body with a distal portion thereof having a fluted external surface.

5. The apparatus of claim 4, further comprising:
an activation button exposed outside the housing and connected to a proximal end of the piercing element.

6. The apparatus of claim 5, wherein the piercing element has a smooth cylindrical outer surface between either the one or more openings in the sidewall or the fluted external surface, and the activation button.

7. The apparatus of claim 6, wherein a portion of the piercing element that has the smooth cylindrical outer surface extends through an opening in the housing, the apparatus further comprising:
an elastomeric seal between the smooth cylindrical outer surface of the piercing element,
wherein the smooth cylindrical outer surface is axially long enough that the elastomeric seal remains in contact with and seals against the smooth cylindrical outer surface regardless of the piercing element's position relative to the housing.

8. The apparatus of claim 1, further comprising:
a locking mechanism to lock the piercing in place once it reaches a position where it has pierced the container and established the fluid communication path to the second portion of the reaction chamber.

9. The apparatus of claim 1, further comprising:
one or more fluid distribution channels in the second portion of the reaction chamber configured to carry the second liquid chemical reactant from the fluid communication path to a section of the first portion of the reaction chamber away from where the flexible container is located,
wherein the one or more fluid distribution channels comprise multiple distribution channels, and wherein each of the fluid distribution channels extends in radial direction that is different than the others.

10. The apparatus of claim 1, wherein the flexible container is a plastic bag.

11. The apparatus of claim 1, wherein a first one of the liquid chemical reactant and the second liquid chemical reactant comprises a potassium permanganate solution and wherein a second one of the liquid chemical reactant and the second liquid chemical reactant comprises a glycerine solution.

12. The apparatus of claim 1, further comprising:
a storage compartment for a food substance or some other substance to be heated, wherein at least one wall of the storage compartment is in direct physical contact with and thermally coupled to the reaction chamber.

13. The apparatus of claim 12, further comprising a meltable substance in the storage compartment, wherein, upon heating, the meltable substance melts and at least partially mixes with and/or covers the food or other substance to be heated in the storage compartment.

14. The apparatus of claim 1, further comprising:
one or more fluid distribution channels in the second portion of the reaction chamber configured to carry the second liquid chemical reactant from the fluid communication path to a section of the first portion of the reaction chamber away from where the flexible container is located,
wherein the one or more fluid distribution channels are configured to carry the second liquid chemical reactant to a section of the first portion of the reaction chamber away from where the flexible container is located so that the flexible container is not able to block the second liquid chemical reactant from entering the reaction chamber and mixing sufficiently with the first liquid chemical reactant.

15. An apparatus for heating a product, the apparatus comprising:
a storage compartment containing one or more products to be heated; and
a heater module physically and thermally coupled to the storage compartment and configured to produce heat, when activated, for heating the one or more products in the storage compartment,
wherein the heater module comprises:
a housing that defines a reaction chamber inside the housing;
a rigid barrier inside the reaction chamber that demarcates a first portion of the reaction chamber from a second portion of the reaction chamber;
a first liquid chemical reactant inside the reaction chamber;
a flexible bag immersed in the first liquid chemical reactant;
a second liquid chemical reactant inside the flexible bag,
wherein the first chemical reactant and the second chemical reactant are configured to produce an exothermic chemical reaction when they come into contact with each other;
a piercing element that is movable, by a user, to pierce the flexible bag,
wherein, after piercing the flexible bag, when a distal end of the piercing element is inside the flexible bag, the piercing element establishes or helps establish a fluid communication path from inside the flexible bag to the second portion of the reaction chamber.

16. An apparatus for heating a product, the apparatus comprising:
a housing that defines a reaction chamber;
a first liquid chemical reactant inside the reaction chamber;
a flexible container inside a first portion of the reaction chamber;
a second liquid chemical reactant inside the flexible container and configured to react exothermically upon contact with the first liquid chemical reactant;
a piercing element that is movable to pierce the flexible container;

one or more fluid distribution channels in a second portion of the reaction chamber, separated from the first portion of the reaction chamber by at least one rigid barrier, wherein the piercing element is configured to pierce the flexible container and establish or help establish a fluid communication path from inside the flexible container to the second portion of the reaction chamber.

\* \* \* \* \*